United States Patent
Carver et al.

(10) Patent No.: US 8,417,590 B2
(45) Date of Patent: Apr. 9, 2013

(54) METHOD OF MAINTAINING AIRCRAFT

(75) Inventors: David Carver, Rolling Meadows, IL (US); Jayson Carver, Chicago, IL (US)

(73) Assignee: Jet X Aerospace, LLC, Bensenville, IL (US)

( * ) Notice: Subject to any disclaimer, the term of this patent is extended or adjusted under 35 U.S.C. 154(b) by 2065 days.

(21) Appl. No.: 11/091,736

(22) Filed: Mar. 28, 2005

(65) Prior Publication Data

US 2005/0230516 A1 Oct. 20, 2005

Related U.S. Application Data

(60) Provisional application No. 60/557,071, filed on Mar. 26, 2004.

(51) Int. Cl.
*G06Q 10/00* (2006.01)
(52) U.S. Cl.
USPC .......................................................... 705/28
(58) Field of Classification Search .................. None
See application file for complete search history.

(56) References Cited

U.S. PATENT DOCUMENTS

| | | | | |
|---|---|---|---|---|
| 5,469,363 | A * | 11/1995 | Saliga | 700/225 |
| 5,778,381 | A * | 7/1998 | Sandifer | 707/104.1 |
| 6,311,434 | B1 * | 11/2001 | Nelson | 52/143 |
| 6,816,762 | B2 * | 11/2004 | Hensey et al. | 701/35 |
| 6,885,921 | B1 * | 4/2005 | Farmer | 701/29 |
| 7,103,567 | B2 * | 9/2006 | Smukowski | 705/26 |
| 7,487,013 | B2 * | 2/2009 | Miklos | 701/3 |
| 2001/0034673 | A1* | 10/2001 | Yang et al. | 705/28 |
| 2004/0106404 | A1* | 6/2004 | Gould et al. | 455/431 |

OTHER PUBLICATIONS

FAA Order 8120.11 teaches the Disposition of Scrap or Salvageable Aircraft Parts and Materials, dated Feb. 12, 1996, 7 pages, downloaded on Mar. 8, 2010 from http://rgl.faa.gov/Regulatory_and_Guidance_Library/rgOrders.nsf/786843013bf2d0498525698 10075c599/517999d93bfbd84786256abf006f362b/$FILE/8120.11.pdf.*

* cited by examiner

*Primary Examiner* — Paul Danneman
(74) *Attorney, Agent, or Firm* — Pauley Petersen & Erickson

(57) ABSTRACT

A method of maintaining aircraft provides for the secure, efficient acquisition and certification of aircraft parts as a closed loop system within the airfield where the aircraft is grounded and in proximity to the aircraft.

8 Claims, No Drawings

METHOD OF MAINTAINING AIRCRAFT

This application claims priority from U.S. provisional application No. 60/557,071; filed 26 Mar. 2004.

BACKGROUND

Commercial aircraft parts are needed daily in the ongoing required maintenance schedule of various airline fleets. Some parts are replaced due to regular maintenance and some are required due to part failure. There are a multitude of parts that the Federal Aviation Administration (FAA) has determined to be groundable items. In effect, if groundable parts fail, the aircraft is immediately grounded and that aircraft is put into a status known as A.O.G. (Aircraft On Ground). The A.O.G. status has the highest level of priority in the aviation industry because a grounded aircraft results in lost revenue to the airline using the aircraft. Because of stringent safety concerns, in the U.S. alone there are hundreds of aircraft grounded daily.

Currently the airline parts and supply chain is very fragmented in both physical location as well as service procedures. This fragmentation creates an ineffective process which in turn costs the airlines a great deal of lost time, negative customer relations, and additional shipping fees.

Obviously when an aircraft is grounded it is located at the airport, usually at a departure/arrival gate. Delays such as this create a back-up effect on the entire operation of the airport facility and thus cause a rippling effect to other air-carriers and other airports.

Once a groundable part has been determined to have failed, the maintenance team of the air-carrier must replace that part prior to the aircraft leaving the gate. All parts on a commercial aircraft have very specific part numbers that corresponds with the aircraft manufacturer's requirements. The maintenance team isolates the failed part and then contacts the airline internal purchasing department to request a replacement part. The purchasing department will then start a global search for a certified version of the needed part. Most purchasing departments will simply call a few of their preferred vendors and allow the vendors to search the availability of needed parts. The vendors will complete the research and then forward the information to the airline purchasing department, which will in turn check with the maintenance team to see if the part will eliminate the problem. Availability time for obtaining the part to get the aircraft flying often quickly surpasses the price of the part as a purchasing factor.

The maintenance team must verify that the part has the proper FAA certification and documents prior to installing the part on the aircraft. It is common for additional time to be lost during this verification of certification, and in the event that proper a certification cannot be established for the part, the part cannot be placed on the aircraft and the entire search process must restart from the beginning.

The cost to airlines for using this outdated and fragmented system is great. In addition to lost operating costs and gate delay penalties, there can be the negative impact of customer discomfort, and the expense of food, free travel vouchers, and even free hotel vouchers for all passengers on the aircraft.

SUMMARY OF THE INVENTION

The present invention provides a closed loop parts and maintenance system that provides efficiency and streamlines the supply of aircraft parts.

In one preferred embodiment, one or more airfield response centers are provided directly on the airfield. Each airfield response center is equipped with at least one mobile response truck that carriers a small inventory of critical parts as well as a complete on-board wireless computer system. This wireless computer system has the capability to access all data needed to obtain and certify parts and communicate with the relevant entities necessary to remove the aircraft from A.O.G. status.

One preferred method of providing certified parts for maintenance of grounded aircraft can therefore include the steps of locating a mobile facility on airport grounds; providing the mobile facility with wireless communications; providing the mobile facility with an inventory of aircraft parts; providing the mobile facility with at least one computer system including accessibility of: i) a database of up to date part information including required FAA certifications for aircraft parts, ii) an inventory locator for finding the location and condition of aircraft parts, iii) an illustrated parts catalog of an aircraft manufacturer, iv) an aircraft manufacturer website, v) FAA websites, and vi) wireless faxing, email, and printing capabilities. One preferred method may further include the steps of staffing the mobile facility with a security-cleared attendant; locating the mobile facility in proximity to the grounded aircraft; locating an aircraft part and its certification documentation necessary for the maintenance of the grounded aircraft; and providing the aircraft part and its certification documentation to maintenance personnel for the aircraft. It will noted that as used herein, "maintenance personnel" is to be defined as anyone in the aircraft maintenance chain, and not necessarily just the actual mechanics operating directly on the aircraft.

One preferred method may further include one or more of the steps of verifying the part and its certifications by electronic document transfer to the mobile facility; obtaining part certification approval from a relevant authority at at least one of the mobile facility or the grounded aircraft; preparing a price quote for the aircraft part including the necessary copies of the trace, i.e., provenance, documents, and including the timing of delivery, price history, and current cost for the aircraft part. Location of the groundable part replacement may including filtering responses of the inventory locator by proximity of the aircraft replacement part to the grounded aircraft in order to obtain the fastest possible delivery. Further steps according to methods of the present invention may include ordering the aircraft part to be delivered by courier to the airport grounds; and receiving the part at the airport grounds by a security-cleared attendant.

DETAILED DESCRIPTION OF PREFERRED EMBODIMENTS

In one preferred embodiment, one or more airfield response centers are provided directly on the airfield. At least one of the airfield response centers is equipped with a mobile response truck that carriers a small inventory of critical parts as well as a complete on-board wireless computer system. This wireless computer system has the capability to access the following systems:

Quantum Control Inventory Control System

The Quantum Control Inventory Control System can electronically provide up to date part information regarding manufacture, list price, response center available stock and current and historical price information. This system also completes and tracks the sales quote, sales order, purchase order, and all required FAA certifications.

Inventory Locator Service (ILS Mart)

The ILS Mart is a internet based database of part supplies and suppliers around the world. This database can be accessed electronically, e.g., through the Internet, intranets, private networks, or the like. With the proper authorization, a company can enter a needed part number and have information on who has the part, where the part is located, the condition of the part, and the quantity on hand.

Illustrated Parts Catalogue (IPC)

The IPC is an electronic parts list prepared by the aircraft manufacturer outlining the entire aircraft. The IPC tells the maintenance teams what parts can be placed where and provides complete instructions on additional corresponding part numbers.

Access to Manufacturer's Web Sites

Each manufacturer of aircraft parts has some type of support site accessible electronically, e.g., through the Internet or the like. These sites provide valuable information such as replacement part numbers, part advisories, part availability, and list costs.

Federal Aviation Administration

The FAA supports many Internet based sites that update important information such as unapproved parts, part or aircraft advisories, and security warnings.

Complete Communication Links

Complete wireless faxing, email, and printing capabilities are provided within the mobile response truck. By providing and using a completely wireless, secure, mobile, airfield response truck, the necessary resources can be placed directly on the airfield and directly at the grounded aircraft.

With the heightened security at airports, secure access is imperative. By being a tenant of the airfield, all response center employees are subject to complete FAA and FBI background checks and clearances, thus reducing the amount of escorted (un-cleared) traffic onto the airfield.

Since timing is a critical issue in the maintenance process, the suppliers of needed parts are preferably filtered by time or geographical proximity to the location where the aircraft is grounded. For example, a supplier able to drop off the replacement part at the airport in one hour will have an advantage over a supplier having to ship or courier the replacement part across the country.

Once a groundable part has been determined to have failed, the maintenance team of the air-carrier must replace that part prior to the aircraft leaving the gate. The maintenance team will contact the Response Center (available 24 hours a day) for assistance. The Response Center truck pulls up directly next to the aircraft and works with the maintenance team in assessing the part needs of the aircraft. The Response Center staff then starts the wireless search using all data and communication sources necessary; e.g., the Response Center inventory, the global parts database, manufacturer's parts availability, and personal company relationships. During this time-sensitive search the part availability, location, and price history is established. After phone verification is completed and a source is determined to have a match, the certifications can be electronically forwarded, e.g., emailed or faxed, i.e. facsimile transmitted, directly to the Response Center truck for the airline maintenance approval. If the documentation passes this maintenance approval, the Response Center staff quickly prepares the proper part quote including the trace documents, timing of delivery, price history, and current cost. Armed with this information the maintenance teams are able to go directly to their purchasing department with all necessary information concerning the required replacement part.

From the airline purchasing department, the airline purchase order can be emailed of faxed directly to the Response Center truck. In turn, the needed part is then ordered from the approved source or released out of the Response Center stock for delivery. In the event that the part is located at a source that requires shipment, the Response Center desirably has an agreement with a specialized courier company providing 24-hour service. This courier service can send out an agent to pick the part up at the approved source, deliver it to the closest airport and place it on the next available flight to the destination airport. Because the Response Center is a tenant at the airfield, the Response Center personnel can be awaiting the arrival of that flight and receive the A.O.G. replacement part while it is unloaded. The replacement part can then be inspected and entered into the on-board computer system the Response Center truck, allowing the proper FAA certifications to be printed as the replacement part is delivered to the grounded aircraft. Thus, the method of the present invention provides closed loop system and dramatically reduces delays.

The Response Center can also be used for distribution of non-A.O.G. critical parts and supplies, various repair facility receiving and shipment services, and a source for aircraft information.

The invention illustratively disclosed herein suitably may be practiced in the absence or the addition of any element, part, step, component, or ingredient which is not specifically disclosed herein.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A method of providing certified parts for maintenance of grounded aircraft comprising:
 a) contacting a response center on an airfield, the response center including at least one mobile facility providing a closed loop parts and maintenance system;
 b) locating a mobile response truck on airport grounds, the mobile response truck including a limited inventory of critical parts, wireless communications and at least one computer system;
 c) accessing from the mobile facility at least one of:
  i) a database of up to date part information including required FAA certifications for aircraft parts,
  ii) an inventory locator for finding the location and condition of aircraft parts,
  iii) an illustrated parts catalog of an aircraft manufacturer,
  iv) an aircraft manufacturer website,
  v) FAA websites, and
  vi) wireless faxing, email, and printing capabilities; and
 d) staffing the mobile facility with a security-cleared attendant;
 e) locating the mobile facility in proximity to the grounded aircraft;
 f) accessing data from the mobile facility to obtain an aircraft part and an aircraft part certification documentation for the grounded aircraft;
 g) providing the aircraft part and the aircraft part certification documentation to maintenance personnel for the aircraft; and
 h) verifying the part and its certifications by electronic document transfer to the mobile facility.

2. The method of claim 1 further comprising obtaining part certification approval at at least one of the mobile facility or the grounded aircraft.

3. The method of claim 1 further comprising preparing a price quote for the aircraft part including provenance documents, timing of delivery, price history, and current cost for the aircraft part.

4. The method of claim 1 further comprising filtering responses of the inventory locator by proximity of the aircraft part to the grounded aircraft.

5. The method of claim 1 further comprising ordering the aircraft part to be delivered by courier to the airport grounds.

6. The method of claim 1 further comprising receiving the part at the airport grounds by the security cleared attendant.

7. The method of claim 1 further comprising providing the mobile facility with an inventory of aircraft parts.

8. A method of providing certified parts for maintenance of grounded aircraft comprising:
   a) contacting a response center on an airfield, the response center including at least one mobile facility providing a closed loop parts and maintenance system;
   b) locating a mobile response truck on airport grounds, the mobile response truck including a small inventory of critical parts, wireless communications and at least one computer system;
   c) accessing from the mobile facility at least one of:
      i) a database of up to date part information including required FAA certifications for aircraft parts,
      ii) an inventory locator for finding the location and condition of aircraft parts,
      iii) an illustrated parts catalog of an aircraft manufacturer,
      iv) an aircraft manufacturer website,
      v) FAA websites, and
      vi) wireless faxing, email, and printing capabilities; and
   d) staffing the mobile facility with a security-cleared attendant;
   e) locating the mobile facility in proximity to the grounded aircraft;
   f) filtering responses of the inventory locator by proximity of the aircraft part to the grounded aircraft;
   g) accessing data from the mobile facility to obtain an aircraft part and an aircraft part certification documentation for the grounded aircraft;
   h) verifying the part and its certifications by electronic document transfer to the mobile facility; and
   i) providing the aircraft part and the aircraft part certification documentation to maintenance personnel for the aircraft.

* * * * *